United States Patent [19]

Frese et al.

[11] 4,171,295
[45] Oct. 16, 1979

[54] AQUEOUS EMULSIONS OF POLYOLEFINS/BITUMEN PLASTIC OR PLASTIC-ELASTIC MATERIALS AND PROCESS FOR THE PRODUCTION THEREOF

[75] Inventors: Albert Frese; Hermann Roeben; Horst Denzel, all of Marl, Fed. Rep. of Germany

[73] Assignee: Chemische Werke Huels Aktiengesellschaft, Marl, Fed. Rep. of Germany

[21] Appl. No.: 843,617

[22] Filed: Oct. 19, 1977

[30] Foreign Application Priority Data

Oct. 29, 1976 [DE] Fed. Rep. of Germany ....... 2649373

[51] Int. Cl.$^2$ .............................................. C08L 91/00
[52] U.S. Cl. ................................. 260/23 H; 260/4 R; 260/5; 260/23 EM; 260/23.5 A; 260/28.5 AS; 260/23.7 A
[58] Field of Search ............. 260/28.5 AS, 23 H, 4 R, 260/5, 23 EM, 23.5 A, 23.7 A

[56] References Cited

U.S. PATENT DOCUMENTS 3,891,586  6/1975  Califano et al. ............. 260/28.5 AS
3,933,710  1/1976  Fukushi et al. ............... 260/28.5 AS
3,979,916  9/1976  Califano et al. ............... 260/28.5 AS Primary Examiner—Melvyn I. Marquis
Attorney, Agent, or Firm—Millen & White

[57] ABSTRACT

Aqueous emulsions of olefin polymers and bitumen comprise:
(a) 5–30% by weight of an extensively amorphous poly-α-olefin or poly-α-olefin mixture having viscosity numbers J of 5–400 cc./g. and ether-soluble proportions of more than 60%, wherein up to three quarters by weight of these polyolefins can be replaced by an elastomer;
(b) 5–40% by weight of a hydrocarbon oil optionally containing a drying oil, wherein the hydrocarbon oil is a polybutene oil or the distillation residue form cyclododecatriene manufacture and/or a mixture of both;
(c) 10–40% by weight of a bitumen;
(d) 0–10% by weight of a chlorinated paraffin having a chlorine content of 45–60% and/or an aromatic bromine compound;
(e) 0–20% by weight of a conventional additive;
(f) 2–15% by weight of a surfactant; and
(g) 15–78% by weight of water.

19 Claims, No Drawings 4,171,295

AQUEOUS EMULSIONS OF POLYOLEFINS/BITUMEN PLASTIC OR PLASTIC-ELASTIC MATERIALS AND PROCESS FOR THE PRODUCTION THEREOF

BACKGROUND OF THE INVENTION

The present invention relates to aqueous emulsions of plastic or plastic-elastic materials based on olefin polymers and bitumen.

Bituminous materials (bitumen, tars, pitches, etc.) have only a limited plastic temperature range as defined, for example, by DIN 1995. The difference between the brittle point (DIN 1995, Fraas) and the softening point (DIN 1995, ring and ball) for such materials is small. Methods for considerably widening the plastic temperature range are known. For example, DOS (German Unexamined Laid-Open Application) No. 2,503,782 employs addition of an extensively amorphous homo- or copolymer of propylene and of the distillation residue from cyclododecatriene manufacture. However, such thermoplastic bituminous materials have higher softening points, and can be processed in the molten state only at higher temperatures. Thus, heating of these materials at building sites is required and often can be conducted only with very great difficulty and expense.

Aqueous bituminous emulsions have also been developed. These contain diluents, such as aliphatic and aromatic hydrocarbon, for example xylene. These hydrocarbons are harmful to the environment. Moreover, they are highly flammable and, in part, physiologically harmful. Consequently, the evaporation of the diluent poses significant problems and, as well, entails shrinkage of the mass of material.

Heretofore, it has been impossible to prepare aqueous emulsions from polyolefin-containing, bituminous materials, even by addition of diluents and/or solvents.

SUMMARY OF THE INVENTION

Accordingly, it is an object of this invention to provide polyolefin-containing, bituminous materials having a broad plastic temperature range.

It is another object of this invention to provide such materials which can be processed in cold state by simple techniques and which do not contribute to environmental pollution or pose a health hazard.

This and other objects of this invention have been attained by providing a composition comprising:
 (a) 5–30% by weight of an extensively amorphous poly-α-olefin or poly-α-olefin mixture having viscosity numbers J of 5–400 cc./g. and ether-soluble proportions of more than 60%, wherein up to three quarters by weight of these polyolefins can be replaced by an elastomer;
 (b) 5–40% by weight of a hydrocarbon oil optionally containing a drying oil, wherein the hydrocarbon oil is a polybutene oil or the distillation residue from cyclododecatriene manufacture and/or a mixture of both;
 (c) 10–40% by weight of a bitumen;
 (d) 0–10% by weight of a chlorinated paraffin having a chlorine content of 45–60% and/or an aromatic bromine compound;
 (e) 0–20% by weight of a conventional additive;
 (f) 2–15% by weight of a surfactant; and
 (g) 15–78% by weight of water.

The emulsions consist of 30–80%, preferably 40–50% of an aqueous emulsifier solution and of 70–20%, preferably 60–50% of a polyolefin-containing material. The aqueous emulsifier solution proportion is composed of components f and g, and the polyolefin-containing material proportion refers to components a–e.

DETAILED DISCUSSION

Suitable extensively amorphous polyolefins, which make up 5–30% by weight, preferably 10–25% by weight, especially 15–20% by weight of the emulsions, include extensively atactic polypropene, polybutene-1, and polyhexene-1, the copolymers thereof with up to 20% of ethylene and/or up to 50% of propene, butene-1 or 1-hexene, and mixtures of such polyolefins. Suitable polyolefins are in general derived from $C_2$–$C_6$ olefin monomers.

The term "extensively amorphous", e.g., extensively atactic, is defined as having an ether-soluble proportion of more than 60%, preferably 70–100%, and a heptane-soluble proportion of about 100%. The ether-solubility is measured with boiling diethylether under reflux at a temperature of 34.6° C. The heptane-soluble proportion is measured with boiling n-heptane under reflux at a temperature of 98.3° C. These polyolefins have viscosity numbers J of 5–400 cc./g., preferably 20–200 cc./g., especially 30–100 cc./g. (Viscosity numbers J are viscosities of solutions as measured by DIN 53728). This corresponds to weight average molecular weights, calculated from measurements of the solution viscosity for polybutene-1, of about 10,000 to 1,830,000, preferably about 35,000 to 770,000, especially about 60,000 to 310,000.

Such extensively amorphous, plastic polyolefins can be obtained, for example by polymerizing propene, butene-1, or 1-hexene, optionally with ethene, propene, butene-1, or 1-hexene as comonomers, with catalysts of $TiCl_4$, $TiCl_3$, or preferably $TiCl_3$.n $AlCl_3$ (n=0.2 to 0.6), and $AlR_3$, at temperatures of 50°–120° C., especially 60°–100° C. Suitable $AlR_3$ include aluminum $C_{1-8}$-alkyls preferably triisobutylaluminum. The molar ratio of Al:Ti is preferably 2–3. The polymerization can be conducted continuously or discontinuously, either in solution or in bulk. The solvents employed are $C_4$ or $C_3/C_4$ hydrocarbon cuts.

Also suitable are the extensively atactic poly-α-olefins obtained as by-products in the manufacture of isotactic polypropene and polybutene-1. In this case, however, it is necessary, especially in the case of extensively atactic polypropene, that such by-products be free to a maximum extent from crystalline, isotactic polypropene. Such material is to be practically completely soluble in boiling heptane.

Also suitable as the extensively amorphous poly-α-olefins of (a) are mixtures of the aforementioned, extensively amorphous plastic polyolefins with elastomers. Suitable elastomers are preferably copolymers of 1,3-butadiene with 5–55% by weight of styrene and optionally small amounts, i.e., 1–5% by weight of unsaturated acids and/or esters thereof. These are produced in the form of a latex by radical polymerization [Hölscher, Dispersionen synth. Hochpolymerer, Part 1, pp. 106, Springer Verlag, Berlin (1969), Ullmanns Encyklopädie der techn. Chemie, 9. Band, pp. 308–353 (1957)]. Suitable unsaturated acids and/or esters are preferably acrylic and methacrylic acid and esters thereof such as the octylester or butylester. Suitable elastomers include copolymers of 1,3-butadien with 5–40% by weight of acrylonitrile and natural rubbers. These mixtures contain up to 75% by weight, preferably up to 50% by weight, especially from 10 to 50 by weight of elastomer, based on the total of the poly-α-olefin and elastomer proportions.

Suitable hydrocarbon oils, contained in the emulsions of this invention in amounts of 5–40% by weight, preferably 10–30% by weight, especially 15–25% by weight, are polybutene oils, optionally in mixtures with drying oils; or distillation residues from cyclododecatriene manufacture; and/or mixtures thereof.

Suitable polybutene oils include those having viscosities of 500–1,000,000 mPas/20° C., preferably 1,000–100,000 mPas/20° C., especially 2,000–30,000 mPas/20° C. Such polybutene oils have number average molecular weights of 500–1,000 as determined by cryoscopy measurement. Low boiling proportions boiling below 100° C. at 15 mm. should not be included. Such polybutene oils can be obtained, for example, in conventional manner by the polymerization $C_4$-cuts containing butene-1, butene-2, and optionally isobutene, with Friedel-Crafts catalysts, preferably $AlCl_3$, at temperatures of 0–100° C. By the addition of dienes and/or acetylenes, the viscosity of the polybutene oils can be greatly increased (German Pat. No. 2,005,207). After the polymerization and optionally after a washing step, for example with water, the low-boiling components can be removed by simple heating of the polybutene oils to 100°–150° C. under pressure of about 15 mm. Hg.

If up to 30% preferably from 5 to 15%, of the polybutene oil is replaced by a drying oil, wherein the drying oils may constitute up to 8% of the emulsion, there are obtained plastic and/or plastic-elastic materials whose surfaces harden when exposed to air. Especially suitable as drying oils are polybutadiene oils and drying, natural or synthetic triglycerides, e.g. linseed oil, or mixtures of such substances. Preferably suitable polybutadiene oils are those having number average molecular weights of 1,500–3,000, as determined by cryoscopy measurement; viscosities of 750–3,000 mPa s/20° C.; and iodine numbers of between 400 and 500 g. iodine/100 g. These can be produced according to the process of German Pat. No. 1,186,631.

To accelerate the hardening process, siccatives can be added to the drying oils, preferably cobalt octoate and cobalt naphthenate in amounts of up to 0.5%, especially 0.02–0.2%, based on the amount of the drying oil. The siccatives can also be added as acceleration hardeners when the emulsions contain the distillation residue from the preparation of cyclododecatriene as the hydrocarbon oils.

The suitable distillation residue from cyclododecatriene manufacture has a number average molecular weight of 400–600, as determined by cryoscopy measurement, a density of about 0.93 g./cc., and a viscosity of 400–2,500 mPa s/20° C. This distillation residue consists of 5–10% of cyclododecatriene. About 35–38% of the distillation residue can be distilled. Of this total, about 11% is constitued by $C_{12}$-hydrocarbons, about 12% by $C_{16}$-hydrocarbons, about 10% by $C_{20}$-hydrocarbons, and about 5% by $C_{24}$- to $C_{32}$-hydrocarbons. The double bonds of the cyclododecatriene residue are predominant, more than 80% being trans-double bonds and about 10–15% cis-double bonds. The distillation residue is obtained during the distillative purification of cyclododecatriene at temperatures of 100°–237° C. under pressure of 10–760 mm. Hg. which has been produced from 1,3-butadiene with titanium catalysts and organoaluminum compounds (German Pat. No. 1,050,333 and German Pat. No. 1,112,069). Essential characteristics of the distillaton residue are: number average molecular weight of 400–600, a density of 0.93 g./cc., a viscosity of 400–2,500 mPas/20° C., more than 80% trans-double bonds and about 10–15% cis-double bonds. About 11% is constituted by $C_{12}$-hydrocarbons, about 12% by $C_{16}$-hydrocarbons, about 10% by $C_{20}$-hydrocarbons, and about 5% by $C_{24}$- to $C_{32}$-hydrocarbons. Equivalent materials with these essential characteristics will be readily recognized of skilled workers as also being suitable for use in this invention. This residue from the cyclododecatriene distillation is also employed in amounts of 5–40% by weight, preferably 10–30% by weight, especially 15–25% by weight. The residue, as for the drying oils, has the effect of hardening the surface of the product materials when the latter are exposed to air.

Suitable bitumens, which are contained in the emulsions in amounts of 10–40% by weight, preferably 15–35% by weight, especially 20–30% by weight, include primary bitumen, blown bitumens, and natural asphalts. The softening points of these materials range preferably between +25° and +120° C., especially between +25° and +75° C. (DIN 1995, ring and ball); the brittle points range between −20° C. up to above room temperature, especially between −20° and +3° C. (DIN 1995, Fraass); and the penetration depth is between 400 and 2 1/10 mm., especially between 300 and 10 1/10 mm. (DIN 1995). Likewise suitable are any other bituminous blends, tars, and pitches, for example B 500, having rather low solidification points such as those defined above.

Suitable chlorinated paraffins and/or aromatic bromine compounds, to be included in amounts of up to 10% by weight, preferably 1–5% by weight, especially 2–3% by weight, include chlorinated paraffins having a chlorine content of 45–60%, preferably 50–55%, respecially 52–54%, and aromatic bromine compounds, such as brominated amines disclosed in German Pat. No. 1,127,582, or tribromoaniline disclosed in German Pat. No. 1,103,020; brominated aromatic or aromatic-aliphatic ethers, such as penta- or decabromodiphenyl ethers disclosed in German Pat. Nos. 1,123,823 and 1,135,654; bromine compounds having a $C_{12}$-ring such as hexabromocyclododecane according to DAS (German Published Application) No. 1,128,975; brominated diaromatics as disclosed in German Pat. No. 1,135,653; all of which can optionally be utilized, in accordance with German Pat. No. 1,230,209, in combination with chlorinated paraffins; but preferably bromine compounds such as 2,4,6-tribromophenyl-β,γ-dibromopropyl ether or 2,2-bis[4-(β,γ-dibromopropoxy)-3,5-dibromophenyl]propane disclosed in DAS No. 1,669,811. The bromine compounds can also be used in mixture with the chlorinated paraffins containing 45–60% of chlorine, in a weight ratio of from 95:5 to 30:70 (bromine compound/paraffin). These halogen compounds render the materials nonflammable.

Conventional additives which can be incorporated into the emulsions of this invention to an amount of up to 20% by weight, preferably 5 to 15%, include, for example, fillers, such as talc, heavy spar [baryte] and silicic acid; stabilizers such as phenol derivatives and amines; and especially flameproofing agents, such as antimony trioxide, tin dioxide, or modified clays. The proportion of the flameproofing agents, independent of the presence of other conventional additives is not to exceed 10%, especially 5%.

Suitable sufactants, which are utilized in amounts of 2-15% by weight, preferably up to 12% by weight, particularly 8-10% by weight, include ionic and non-ionic emulsifiers. Suitable ionic emulsifiers include anionic emulsifiers, such as alkyl benzensulfonates, as well as cationic emulsifiers, such as amino amides and polyamino amides of the formula

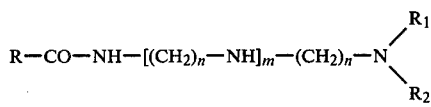

wherein R is a saturated or unsaturated aliphatic hydrocarbon residue having 13-19 carbon atoms; n is an integer of 2-6; m is an integer of 0-5; and $R_1$ and $R_2$ are alkyl groups of 1-3 carbon atoms or hydrogen.

Also suitable are the salts of the amino amides with fatty acids, such as formic acid, acetic acid, propionic acid, or homologs thereof, and mineral acids, such as hydrochloric acid, sulfuric acid, and phosphoric acid, preferably hydrochloric acid, sulfuric acid, or phosphoric acid, as well as mixtures of the amino amides with these salts.

The amino amides can be obtained in conventional manner by the condensation of long-chain, saturated or unsaturated fatty acids, such as palmitic acid, stearic acid, oleic acid, or other fatty acids of more than 10 carbon atoms, or mixtures of several such acids, preferably stearic acid and palmitic acid, particularly also by using the mixture of the fatty acids present in vegetable oils, such as tall oil and linseed oil; with an N,N-dialkyl diamine, such as N,N-dimethyl-1,3-diaminopropane, N,N-dimethyl-1,4-diaminobutane, N,N-dimethyl-1,6-diaminohexane; N,N-dimethyl-1,3-diaminopropane being preferred.

Further suitable are the imidazolines produced by heating the polyamino amides while splitting off water; and also the quaternization products of the amino amides and polyamino amides, obtained by reaction with alkyl chlorides, dialkyl sulfates, or alkylene oxides.

Suitable cationic emulsifiers furthermore include condensed aminoalkyl phenols of the formula

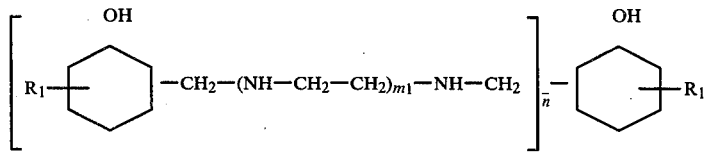

wherein $R_1$ is an alkyl hydrocarbon residue of 8-10 carbon atoms present in the ortho- or para-position with respect to the OH-group; $m_1$ is an integer from 2-6; and n represents the arithmetic means of a number from 1.0 to 4.0.

The condensed aminoalkyl phenols preferably have an average molecular weight of about 2,000. The condensed aminoalkyl phenols can be obtained by reaction of any alkyl phenol, preferably the commerically available nonylphenol, with formaldehyde and a polyamine, preferably a polyethyleneamine of the general formula

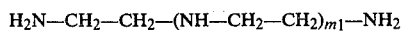

During this reaction, a mixture of compounds is produced in each case, the compounds differing by the degree of condensation. For this reason, only an average molecular weight can be determined.

Suitable nonionic emulsifiers include condensation products of alkyl phenols with ethylene oxide, as well as homo- and copolymers of alkylene oxides, especially the nonylphenol with, for example, eight moles of ethylene oxide.

The cationic emulsifier solutions are preferably adjusted to a pH of 2-4 with the use hydrochloric acid, sulfuric acid, or phosphoric acid. This weakly acidic value increases the stability of the emulsions. At a pH value of about 5.5, the emulsions break up, i.e., they coagulate. This takes place, for example, very rapidly if the cationic emulsion comes into contact with an alkaline material, for example in the form of a filler or a substrate. This break-up phenomenon takes place in the emulsions, inter alia, also due to the fact that the emulsifier concentration is lowered by adsorption of a portion of the emulsifier on the surface to which the emulsion is applied and/or with which it comes into contact, and thereby the required emulsifier concentration will no longer be present. By increasing the emulsifier concentration, this coagulation of the emulsion can be prevented. However, for the emulsions of this invention, the amounts of 2-15% of emulsifier and maintenance of the proper acidic pH values, when cationic emulsifiers are employed, satisfactorily overcomes this undesirable breakup phenomenon.

For anionic emulsifier solutions, such as, for example, the sodium salts of alkyl benzenesulfonic acid, an additional adjustment of the ph is unnecessary, since these compounds display an initial alkaline pH of about 9.5.

The emulsions can be categorized with respect to degree of stability, as stable, half-stable, and unstable. The cationic and the anionic emulsions can be unstable as well as half-stable and also stable. The cationic emulsions are primarily used as rapidly broken-up, unstable emulsions. The nonionic emulsions belong to the stable category. For several fields of application, e.g., for the sealing of engineering structures and for the manufacture of filler-containing mixed material, stable emulsions are preferred. For other applications, for example house and road construction, rapidly broken-up emulsions are preferably utilized.

Fully demineralized water, distilled water, normal drinking water or a mixture thereof is suitably used as the water.

The claimed emulsions are produced in accordance with the invention by first dissolving the emulsifier in water at temperatures of 50°-80° C., preferably 60°-70° C. With the use of cationic emulsifiers, the pH is set to 2-4, for example with dilute hydrochloric acid. Subsequently, under intensive agitation, 50-100%, preferably 50-80%, of the required amount of hydrocarbon oil, heated to a temperature of 100°-150° C., preferably 120°-130° C., is introduced into the warmed emulsifier solution. This emulsion is then combined, under intensive agitation, with the extensively amorphous polyolefin, heated to temperatures of 140°–220° C., and with the bitumen, individually or in a mixture, optionally together with the remaining hydrocarbon oil and the other additives. When using nonionic surfactants, the extensively amorphous polyolefin is preferably heated to temperatures of 140°–160° C.; and when using anionic or cationic surfactants, the compound is heated preferably to temperatures of 140°–200° C. For this procedure, periods of 1–5 minutes are required on a laboratory scale. The agitiation is continued for homogenizing purposes, which takes about another 5 minutes on a laboratory scale. The thus-formed homogenous emulsion is allowed to cool.

The addition of the extensively amorphous polyolefin and of the bitumen, individually or as a mixture, with preferably the remaining 20–50% of the total hydrocarbon oil, is advantageous, particularly when using extensively amorphous polypropene as the extensively amorphous polyolefin, or using higher-melting bitumen qualities, or higher-melting mixtures of polyolefins with bitumen.

The separate addition of the hydrocarbon oil and/or a portion thereof surprisingly produces emulsions having an improved homogeneity and a longer shelf life.

The intensive agitation can be carried out, for example, with high-speed agitating and mixing devices. Also suitable for this purpose are units operating according to the rotor-stator principle, using shearing and vibrating forces, for example an Ultra-Turrax mixer, a "Reaktron" or a "Supraton" device.

The emulsions of the invention, extensively amorphous, plastic polyolefins and bitumen can be mixed with emulsions of elastomers. For such mixtures, those emulsions are preferably suitable which have been prepared with anionic surfactants. However, emulsions of extensively amorphous, plastic polyoelfins, prepared with the aid of cationic and nonionic surfactants, are likewise suitable to a great extent for mixtures with emulsions of elastomers. It is easy to determine whether such mixtures are stable by conducting simple routine experiments. These mixtures with emulsions of elastomers display the advantage that the seals and coatings obtained with them, such as, roof sealants, seals against pressurized and non-pressurized water, and also carpet backings, exhibit plastic-elastic properties. Such plastic and elastic characteristics can be adjusted within a broad range by suitable selection of proportions and ingredients according to conventional considerations. Typical proportions are from 25 to 90 wt.% of the emulsion of this invention and from 10 to 75 wt.% of the elastomer emulsion. The final plastic and elastic characteristics are described in the British Pat. No. 1,443,988. An elastic plastic composition, of high elasticity and good adhesion, is obtained. The composition has a very low brittle point (DIN 1995, Fraas) of −55° to −60° C.

Suitable elastomer emulsions are preferably those, which are produced in the form of a latex by radical polymerization such as copolymers of 1,3-butadiene with styrene or acrylonitrile and natural rubber in form of a latex.

As compared to emulsions which contain solutions and solvents, these emulsions have a great advantage in that they do not contain any solvents which are, in most cases, readily flammable and dangerous to health. Therefore, the emulsions can also be utilized in enclosed areas and within or in the proximity of explosion-proof structures. They are harmless to the environment; the vapors produced by the emulsions are nonflammable and nonpoisonous.

The materials obtained from the emulsions after the water has been removed, furthermore exhibit a surprising advantage with respect to conventional melt compositions and compositions obtained from solutions in that they are more vapor-permeable, while retaining the same leakproofness. Consequently, when used as seals, they prevent the penetration of water, on the one hand, but make it possible for vapor to escape, on the other. This is particularly true for the anionic emulsions.

The emulsions of the present invention, especially the cationic ones, furthermore exhibit another great advantage in that they display very good adhesion even to extremely moist to wet substrates, without an impairment in the sealing properties. The emulsions of this invention, in addition to their high adhesive power, also possess an excellent expansion (elongation) capacity. Furthermore, they exhibit such a good weatherability that it is unnecessary to add stabilizers.

Materials made from emulsions containing a polyisobutene oil as the hydrocarbon oil display a strongly tacky surface after the water has been dissipated and they have been irradiated with ultraviolet light. This feature is of interest, for example, when producing surfaces for roof coverings having gravel or stone chip layers. Materials made from emulsions containing a poly-n-butene oil and/or a distillation residue from cyclododecatriene manufacture as the hydrocarbon oil, display a dry surface skin after dissipation of the water and irradiation with ultraviolet light. This feature is of great interest when the material is used to seal gaps and to manufacture roof coverings and/or roof seals which have no gravel or stone chip layers and which can be used to walk on.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

EXAMPLE 1

An emulsifier solution of 8 parts by weight of a stearic acid aminoamide in 32 parts by weight of water was heated to 70° C. and stirred by means of a mixer operating on the rotor-stator principle, e.g., an Ultra-Turrax mixer. The pH was adjusted to 3.5 by adding dilute hydrochloric acid. Subsequently, 20 parts by weight of a polybutene oil having a viscosity of 20,000 mPa s/20° C. and a molecular weight of 820, which contained no low-boiling components boiling below 150° C. at 15 mm. Hg and which had previously been heated to 120° C., was added under intensive agitation. A melt, heated to a temperature of 180° C., of 20 parts by weight of an extensively amorphous polybutene-1, having a viscosity number J of 50 cc./g. and an ether-soluble proportion of 92%, as well as a melt of 20 parts by weight of a bitumen B 200 were added to this emulsion, likewise under agitation, within a time period of one minute. Then the mixture was thoroughly agitated for another 5 minutes. In this way, a homogeneous emulsion was obtained which could be readily processed by spraying and by application with a brush and which showed excellent adhesion even on an extremely moist to wet substrate. This material is suitable for seals as well as for coatings. After processing and dissipation of the water, the material had a softening point of 154° C., a brittle point of −45° C., a plastic temperature range of 199° C., and penetration of 91 1/10 mm.

EXAMPLE 2

An emulsifier solution of 10 parts by weight of a condensation product of nonylphenol with 8 moles of ethylene oxide in 40 parts by weight of water was heated to 65° C. Under thorough agitation with a high-speed mixer, 20 parts by weight of a poly-n-butene oil, heated to 120° C. and having a viscosity of 4,100 mPa s/20° C. and a molecular weight of 680, was added to the solution. Within a time period of 5 minutes, this emulsion was combined with 30 parts by weight of a melt, heated to 150° C., of a mixture made up of 15 parts by weight of an extensively amorphous propene-butene-1 copolymer with 45% butene-1 proportions and having a viscosity number J of 35 cc./g. and an ether-soluble proportion of 95%, and of 15 parts by weight of a bitumen B 300. Thereafter, the mixture was stirred for another 5 minutes, thus obtaining a homogeneous emulsion which could be readily processed by spraying and by spreading, i.e., by application by brush or similar tool.

After processing and dissipation of the water, the material had a softening point of 136° C., a brittle point of −38° C., a plastic temperature range of 174° C., and a penetration of 106 1/10 mm.

By UV irradiation of the applied and dried materials with the aid of two 125 watt Hg UV lamps at 60° C. located at a distance of 16 cm from the surface of the layer, a dry skin was obtained after only one hour. The previously displayed tackiness of the surface was no longer observed. When exposed to outside weathering, a smooth, elastic skin was obtained after a period of one month.

A stable, homogeneous low-viscosity emulsion which could be very easily sprayed and spread was obtained simply by mixing 50 parts by weight of the emulsion obtained in this example with 50 parts by weight of an emulsion obtained by the radical polymerization of 40 parts by weight of 1,3-butadiene with 55 parts by weight of styrene, and 5 parts by weight of unsaturated carboxylic acids such as acrylic or methacrylic acid in the presence of one part by weight of the sodium salt of a paraffin-($C_{14}$)-sulfonic acid. The thus-obtained coatings had plastic-elastic properties. The emulsions showed excellent adhesion even on wet substances.

EXAMPLE 3

An emulsifier solution of 12 parts by weight of a sodium salt of tetrapropylenebenzenesulfonic acid in 38 parts by weight of water was heated to 70° C. and circulated by means of a mixing unit operating on the rotor-stator principle, such as a "Reaktron" device, for example. A mixture of 3 parts by weight of chlorinated paraffin having a chlorine content of 52% by weight and 15 parts by weight of a distillation residue from cyclododecatriene manufacture having a density of 0.93 g./cc., a viscosity of 1,400 mPa s/20° C., and a molecular weight of 500, heated to 125° C., was introduced into the inlet zone of this disintegrator. Subsequently, the inlet zone of the disintegrator was furthermore charged with a molten mixture, heated to 150° C., of 10 parts by weight of an extensively amorphous polypropylene having a viscosity number J of 30 cc./g. and an ether-soluble proportion of 90%, soluble in boiling heptane to an extent of 100%, 12 parts by weight of a bitumen B 200, 8 parts by weight of the distillation residue from cyclododecatriene manufacture having a density of 0.93 g./cc. and a viscosity of 1,400 mPa s/20° C., and 2 parts by weight of anitmony trioxide. After this mixture had been added, the disintegrator was allowed to run for another 10 minutes, thus obtaining a homogeneous emulsion which could be readily processed by spraying and spreading. Plastic coatings and/or seals which are resistant to flying sparks and radiant heat can be made from the product. These coatings or seals meet the requirements of DIN 4102.

EXAMPLE 4

An emulsifier solution of 8 parts by weight of a palmitic acid aminoamide quaternized with propylene oxide in 42 parts by weight of water was heated to 75° C. and circulated by means of a mixing unit. The inlet zone of this mixing unit was fed with a mixture, heated to 130° C., of 10 parts by weight of a poly-n-butene oil having a viscosity of 2,000 mPa s/20° C. and a molecular weight of 620, as well as 10 parts by weight of a distillation residue of the cyclododecatriene manufacture having a density of 0.93 g./cc., a viscosity of 1,500 mPa s/20° C., and a molecular weight of 520.

In the same way, there was then added to the contents of the mixing unit a melt, heated to 180° C., of a mixture of 15 parts by weight of an extensively amorphous butene-1-propene copolymer having a propene content of 15%, a viscosity number J of 40 cc./g., and an ether-soluble proportion of 95%, obtained by polymerizing butene-1 with propene and with the aid of a catalyst of $TiCl_3.0.35\ AlCl_3$ and triisobutylaluminum at 80° C. with 15 parts by weight of a bitumen B 300.

After this melt had been added, the mixing unit was allowed to run for another 10 minutes, thus obtaining a homogeneous emulsion which could be readily processed by spraying as well as spreading and which showed excellent adhesion even to a wet substrate. If the dried material was irradiated with UV light, for example for one hour with two 125 watt Hg UVlamps at 70° C. at a distance of 16 cm. from the surface of the layer, it developed a dry skin. When exposed to outside weathering, this skin was obtained after a period of one month.

EXAMPLE 5

Following the procedure of Example 1, an emulsion was prepared from 10 parts by weight of a fatty acid aminoamide, 40 parts by weight of water, 15 parts by weight of a polyisobutene oil having a viscosity of 15,000 mPa s/20° C. and molecular weight of 890, 15 parts by weight of an amorphous poly-1-hexene having a viscosity number J of 100 cc./g. and an ether-soluble proportion of 100%, and 20 parts by weight of bitumen B 200. A homogeneous emulsion was obtained which could be readily processed by spraying and spreading and showed excellent adhesion even to an extremely moist substrate. If the dried material was subjected to UV radiation, for example for one hour with a 250 watt Hg UV lamp at 60° C. at a distance of 16 cm., the surface exhibited increased tackiness. When exposed to outside weathering, the increased tackiness was obtained after a one month period. A stable, homogeneous emulsion yielding plastic-elastic coatings was obtained by simply mixing 50 parts by weight of the emulsion obtained in this example with 50 parts by weight of an elastomer emulsion produced by radical polymerization of 87.5 parts by weight of 1,3-butadiene with 8.5 parts by weight of styrene and 4 parts by weight of potassium oleate with the aid of formaldehyde sodium sulfoxylate (Rongalit). This emulsion likewise showed good processability and also adhered to moist substrates.

EXAMPLE 6

According to the description of Example 3, an emulsion was prepared from 8 parts by weight of the sodium salt of tetrapropylenebenzenesulfonic acid, 32 parts by weight of water, 23 parts by weight of a distillation residue of cyclododecatriene manufacture having a density of 0.93 g./cc., a viscosity of 1,500 mPa s/20° C., and a molecular weight of 530, 17 parts by weight of a propenebutene-1-1-hexene copolymer having a butene-1 content of 20% and a 1-hexene content of 30%, a viscosity number J of 35 cc./g., and an ether-soluble proportion of 94%, and 20 parts by weight of a bitumen B 300. In this way, a homogeneous emulsion was obtained which could be readily processed by spraying and spreading and which showed excellent adhesion even to wet substrates.

By simply mixing the above emulsion with elastomer emulsions, stable, homogeneous emulsions were obtained which could be very easily processed and exhibited plastic-elastic properties after processing. Such a product could be prepared by mixing 90–25 parts by weight of the emulsion obtained in this example with 10–75 parts by weight of an elastomer emulsion which is produced by radical polymerization of 87.5 parts by weight of 1,3-butadiene with 8.5 parts by by weight of styrene and 4 parts by weight of potassium oleate with the aid of formaldehyde sodium sulfoxylate. The elastic properties rise with an increasing proportion of the elastomer emulsion.

By using, in place of the 30 parts by weight of the polybutene oil, a mixture of 24 parts by weight of this polybutene oil with 6 parts by weight of linseed oil containing 0.01 part by weight of cobalt octoate, an emulsion was obtained yielding, after processing and separation of the water, a surface-curing sealant and/or coating.

EXAMPLE 7

Analogously to the manner used in Example 1, an emulsion was prepared from 10 parts by weight of a sodium salt of dodecylbenzenesulfonic acid, 30 parts by weight of water, 25 parts by weight of a distillation residue from cyclododecatriene manufacture having a density of 0.93 g./cc., a viscosity of 2,000 mPa s/20° C., and molecular weight of 560, 10 parts by weight of an extensively amorphous polybutene-1 having an I-value of 40 cc./g. and an ether-soluble proportion of 94%, 10 parts by weight of an extensively amorphous polypropene having a viscosity number J of 30 cc./g. an ether-soluble proportion of 90%, and a heptane-soluble proportion of 100%, and 15 parts by weight of a bitumen B 85/25. The thus-obtained homogeneous emulsion could be readily processed by spraying and spreading and also showed excellent adhesion to wet substrates.

The emulsion obtained with this example was readily miscible with elastomer emulsions.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:
1. A composition comprising:
    (a) 5–30% by weight of an extensively amorphous poly-α-olefin mixture having viscosity numbers J of 5–400 cc./g. and ether soluble proportions of more than 60%;
    (b) 5–40% by weight of a hydrocarbon oil;
    (c) 10–40% by weight of a bitumen;
    (d) 0–10% by weight of a chlorinated paraffin having a chlorine content of 45–60%, an aromatic bromine compound or a mixture thereof;
    (e) 0–20% by weight of an additive conventional in bitumen emulsions selected from fillers, stabilizers and flameproofing agents;
    (f) 2–15% by weight of a surfactant; and
    (g) 15–78% by weight of water.
2. The composition of claim 1 wherein up to 75% by weight of the polyolefins in component (a) are replaced by an elastomer.
3. The composition of claim 1 wherein the hydrocarbon oil is a polybutene oil, the distillation residue of cyclododecatriene manufacture or a mixture of both.
4. The composition of claim 3 wherein when the hydrocarbon oil is a polybutene oil, it additionally contains a drying oil.
5. An emulsion composed of the composition of claim 1.
6. A composition comprising the emulsion of claim 5 and an emulsion of an elastomer.
7. The composition which results when the water in the emulsion of claim 6 has been substantially removed.
8. A process for the preparation of the aqueous emulsion of claim 5, which comprises first adding, under intensive agitation, 50–100% of the hydrocarbon oil (b), heated to a temperature of 100°–150° C., to an aqueous solution of the surfactant (f), heated to 50°–80° C.; then, under intensive agiatation, adding to this emulsion the melt of the extensively amorphous polyolefin and of the bitumen, heated to 140°–220° C.
9. The process of claim 8 wherein the polyolefin and the bitumen are added individually.
10. The process of claim 8 wherein the polyolefin and the bitumen are added as a mixture.
11. The process of claim 8 wherein along with the polyolefin and the bitumen the remainder of the hydrocarbon oil and the conventional additives are also added.
12. The process of claim 8 which further comprises mixing the emulsion obtained with an emulsion of elastomers.
13. The process of claim 8, wherein from 50–80% of the hydrocarbon oil (b), is added in the first step and wherein the extensively amorphous polyolefin is polypropylene.
14. The process of claim 13 wherein the remaining 20–50% of the hydrocarbon oil is added along with the polypropylene and bitumen.
15. The process of claim 13 which further comprises mixing the emulsion obtained with an emulsion of elastomers.
16. The process of claim 8, wherein nonionic surfactants are employed and the extensively amorphous polyolefin is heated to temperatures of 140°–160° C. for use in the first step.

17. The process according to claim 8, wherein anionic and cationic surfactants are employed and the extensively amorphous polyolefin is heated to temperatures of 140°-200° C. for use in the first step.

18. The emulsion produced by the process of claim 8.

19. The composition which results after the water in the emulsion of claim 18 has been substantially removed.

* * * * *